May 17, 1966  R. L. LILLESTRAND  3,251,261
STELLAR ABERRASCOPE

Filed May 2, 1960  5 Sheets-Sheet 1

INVENTOR.
ROBERT L. LILLESTRAND
BY
Stuart R. Peterson
ATTORNEY

May 17, 1966 R. L. LILLESTRAND 3,251,261
STELLAR ABERRASCOPE
Filed May 2, 1960 5 Sheets-Sheet 3

INVENTOR.
ROBERT L. LILLESTRAND
BY
*Stuart R. Peterson*
ATTORNEY

May 17, 1966  R. L. LILLESTRAND  3,251,261
STELLAR ABERRASCOPE
Filed May 2, 1960  5 Sheets-Sheet 4

INVENTOR.
ROBERT L. LILLESTRAND
BY
Stuart R. Peterson
ATTORNEY

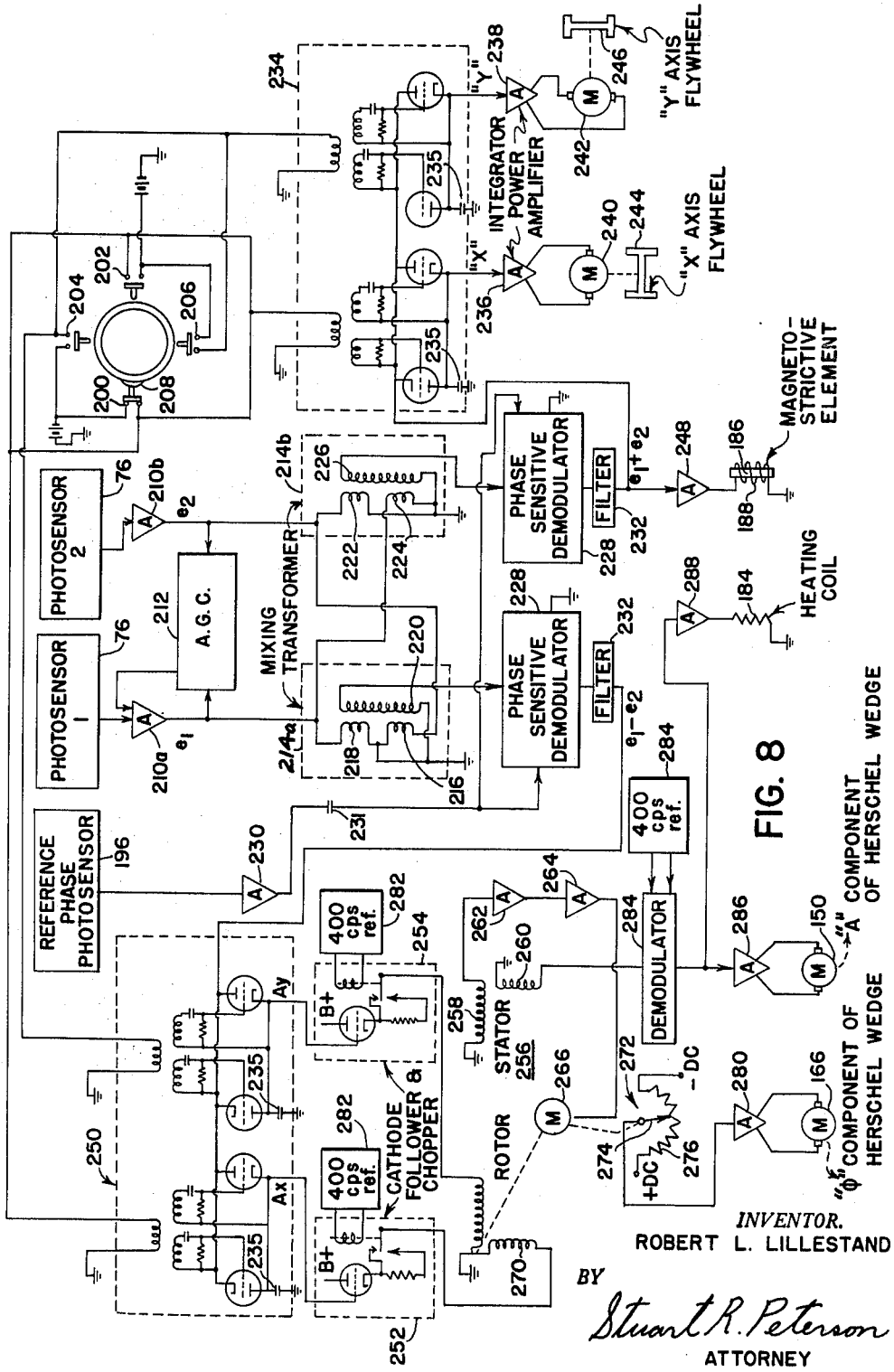

United States Patent Office 3,251,261
Patented May 17, 1966

3,251,261
STELLAR ABERRASCOPE
Robert L. Lillestrand, Minneapolis, Minn., assignor, by mesne assignments, to Litton Systems Inc., Beverly Hills, Calif., a corporation of Maryland
Filed May 2, 1960, Ser. No. 25,910
32 Claims. (Cl. 88—1)

This invention relates generally to geometrical instruments, and pertains more particularly to a telescopic system for making astrometrical determinations from satellites, space vehicles, high altitude balloons and the like, as well as providing certain signals for use in achieving a desired control of this type of vehicle.

Although not limited thereto, it is believed that it will be helpful to an understanding of the invention to allude to several applications or uses that may be made of the invention. For instance, the invention will find utility in connection with satellite and space vehicle navigation systems. In this regard, of the many techniques that are being proposed for the navigation of interplanetary vehicles, star trackers are almost universally used for a precise establishment of the orientation of the coordinate reference. If the angular orientation is to be established to an accuracy better than 20 seconds of arc, it is necessary to correct for the aberration of light. The apparent position of a star, for example, which is perpendicular to the velocity vector of the vehicle will be shifted by 1.10 seconds of arc for every mile per second of vehicular speed. For this reason, when making a precise determination of the coordinate orientation, a star tracking system is needed which will automatically correct for aberrational effects.

Continuing with the navigational application of the invention, it can be pointed out that in addition to the problem of coordinate orientation, there is the problem of measuring the velocity of the space vehicle. This can be done in a number of ways such as the doppler shift (radar or optical), by integrating accelerations, or by successive triangulations. It is also possible to measure the stellar aberrations and thereby calculate the velocity of the vehicle. This has been previously suggested.

In the past, though, the principal problem in using stellar aberrations to determine velocity has been the extreme accuracy with which the relative positions of the star trackers must be set and maintained. For example, in order to measure the velocity to within 100 feet per second, it is necessary to determine the absolute angular position of the stars to an accuracy of 0.02 second of arc. By this is meant that the relative angular positions of the various star trackers must be pre-set to at least this accuracy. To achieve this accuracy for star trackers which are rigidly mounted in a controlled laboratory environment is extremely difficult. Inasmuch as the conditions encountered in space flight will be grossly different as to thermal and accelerational environments, the problem of maintaining the relative angular positions of the star trackers is made even more difficult. Changes by amounts more like seconds of arcs rather than hundredths of seconds of arc are apt to be encountered.

With the star tracking device contemplated by the instant invention, the measurement of vehicular velocity to accuracies of the order of 100 feet per second (0.02 second arc) are possible without requiring that the absolute positions of the various star trackers be set to anywhere near this accuracy. Deviations from the pre-set angular positions as large as one minute of arc will introduce no significant error into the velocity measurement system.

In addition, the instant invention does not require that the telescopes point precisely at the stars in order to accurately measure the relative angles between the stars which are being compared.

Another application of the present system is in the study of planetary atmospheres. By sending a star tracking instrument constructed in accordance with the teachings of the present invention out to a planet, say, the planet Jupiter, and putting the instrument into an orbit around this planet or one of the planet's satellites, it is possible to observe the atmospheric refraction caused by the atmosphere surrounding the planet in question to an extremely high level of accuracy. Consequently, one is enabled to gain additional information about the nature of the atmosphere of a particular planet.

A further application of the system relates to the determination of astrometric quantities. In case a study is desired of proper motions and parallaxes of stars or other motions associated with the position of stars, such study can be readily achieved with the system herein envisaged.

Still further, the instrumentation within the purview of the present invention can be utilized for checking the general theory of relativity by measuring the gravitational light deflection caused by the sun. In this case, for a ray just skimming the edge of the sun the light deflection will be approximately 1.75 seconds. In this regard, the apparatus of the invention would be used to track two stars one of which is diametrically opposite from the other star which is nearer the sun. An article has been written on this subject and is entitled "Test of General Theory of Relativity by Measurement of Gravitational Light Deflection" by the applicant, this paper having been given at the Sixth Annual Meeting of The American Astronautical Society held from January 18–21, 1960.

Having presented the foregoing introductory information, the objects of the invention can be better appreciated. It should be noted that each of these applications has in common the problem of measuring the apparent motions of stars in which the position of one star appears to change relative to another located at some other point in the celestial sphere. Generally this change which we are measuring in apparent relative position is of small magnitude.

Inasmuch as in making the above-alluded to measurements there have been encountered imported alignment problems of the star trackers, the alignment problems being extremely critical because the alignment system is usually made on the ground and the system itself is later operated in a satellite orbit or in a space vehicle travelling in a manner which would cause misalignment from the initial ground adjustment, one important object of the instant invention is to provide a telescopic system in which alignment errors are for all intents and purposes eliminated. Thus, wherever it is desirable that the alignment of a telescopic system be maintained absolute at all times, my system will find considerable utility. More specifically, the invention has for an aim the realization of an accuracy of the order of 1/100 second of arc, whereas previously an alignment accuracy has been possible only of the order of one second of arc. This accuracy is achieved by having devised a telescopic system composed of two fixedly connected telescopes looking in nearly opposite directions and continuously or discretely rotating these telescopes in unison about their common optical axes. Through such an arrangement, the requirement of absolute telescopic alignment is circumvented.

Another object of the invention is to provide a telescopic system using two telescopes that need not be pointed precisely at the stars toward which they are directed and yet which will permit the relative angle of the two stars with respect to the instrument to be measured to a high level of accuracy. For example, it might be desired to achieve an accuracy of 1/100 second of arc in the measurement of the relative star position and yet not be required to point the respective axes of the telescopic system toward these stars with an accuracy any greater than 10 seconds of arc. This alleviates certain critical problems encountered in the design of the space vehicle's attitude control system, and permits the telescopic system to be used in an environment which would otherwise preclude the measurements under consideration.

Another object of the invention is to provide a telescopic system which, as the result of the rotation of these telescopes in inertial space, automatically assures that the two star tracking telescopes are continuously and exactly aligned in diametrically opposite directions. Thus, it is not only possible to determine the extent of the misalignment, but it is also possible with the present invention to correct for this misalignment. This proves possible because the extent of the misalignment is a slowly varying function of time once the final space vehicle environment is achieved. This proves desirable because certain measurments must be quickly made and additional time must be allowed if the extent of the misalignment error is to be determined or is to be cancelled.

Yet another object is to provide an appropriate source of signals whereby the attitude of the satellite or space vehicle may be controlled.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIGURE 8 is a block diagram, portions of which are schematic, illustrating certain control features to be used in conjunction with FIGURE 7.

Figure 1:
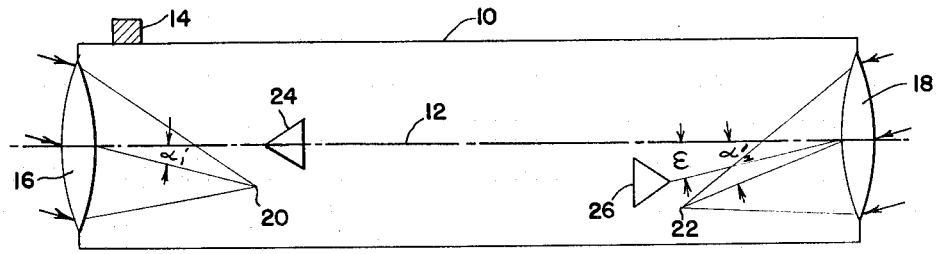
FIGURES 1 and 2 are diagrammatic views embodying the fundamental concept of the invention in a manner so as to illustrate how the star tracker alignment errors are eliminated, FIGURE 2 showing the telescopes rotated through 180° from the position in which they appear in FIGURE 1.
Figure 2:
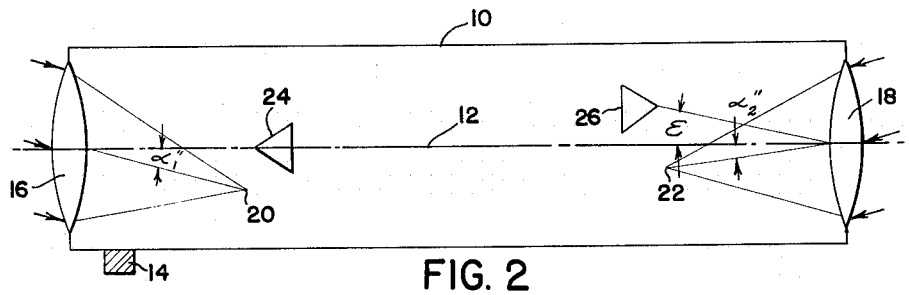

Referring now to FIGURES 1 and 2, the elements there diagrammatically set forth include a cylinder 10 rotatable about its longitudinal axis 12. Inasmuch as the cylinder 10 in FIGURE 2 has been rotated through 180° about its longitudinal axis 12, an indicating element 14 has been fixedly positioned on the outer surface of the cylinder 10. It will be observed that this indicating element 14 appears at the top in FIGURE 1 and at the bottom in FIGURE 2, thereby indicating that the cylinder 10 has been rotated through the alluded to 180° in this latter figure. A pair of telescopic elements 16, 18 are fixedly contained within the ends of the cylinder 10. For drawing simplicity, these elements have been depicted as simple lenses or refractors rather than a more complicated refractor or reflector system. As the description progresses, it will become more readily apparent that the telescopic elements 16, 18 may assume a variety of telescopic configurations, both of the refractory and reflector type. Inasmuch as the invention contemplates aiming one telescopic element 16 at one star and the telescopic element 18 at a second star substantially diametrically opposite the first star, or made so by means of a collinearizing element placed exteriorly to the telescopic system, a pair of stellar images 20, 22 are formed. In this diagrammatic presentation, it is desirable to depict fiducial reference elements with which to show the displacement of the images 20, 22 with respect thereto, this helping to demonstrate more vividly the alignment errors that can occur in a telescopic system of the prior art variety. Therefore, a pair of fiducial elements 24, 26 have been included in FIGURES 1 and 2. It will be noted that the element 26 appears below the axis of rotation 12 in FIGURE 1 and above the axis of rotation in FIGURE 2. Such a change of position, though considerably exaggerated, is representative of the alignment errors that can creep into a dual telescope system. However, it will be shown that by rotating the cylinder 10 through 180°, as is contemplated with the instant system, any alignment errors are obviated.

The apparent aberration in the zero degree position can be represented by $A_1$ and the apparent aberration in the 180° position can be similarly represented by $A_2$. With element 26 misaligned with respect to element 24, the alignment error will be denoted by $\epsilon$. Therefore, $$A_1 = \alpha_1' + (\alpha_2' - \epsilon), \text{ and } A_2 = \alpha_1'' - (\alpha_2'' + \epsilon)$$

The astrometrical aberration angle is indicated by $\alpha$ and can be considered the difference between the apparent star position as seen from a space vehicle and the star position as seen by a reference observer not moving with the space vehicle. Thus, $$\alpha = \frac{A_1 - A_2}{4} = \frac{[\alpha_1' + (\alpha_2' - \epsilon)] - [-\alpha_1'' - (\alpha_2'' + \epsilon)]}{4}$$

Consequently, $$\alpha = \frac{(\alpha_1' + \alpha_2') + (\alpha_1'' + \alpha_2'')}{4}$$

From the last equation it can readily be discerned that the error angle cancels out from the equation. Accordingly, when following the teachings of the instant invention, as will be better understood hereinafter, the alignment errors are actually cancelled with a system of the envisaged character. It is important to note that the sum of the two aberration measurements, $\alpha_1 + \alpha_2$, at any given instant of time does not change as we change the direction of pointing of the telescopic system. This means that we can have a different pointing direction when making measurements in the 0° position than when making measurements in the 180° position without introducing an error in our determination of $\alpha$.

Figure 3:
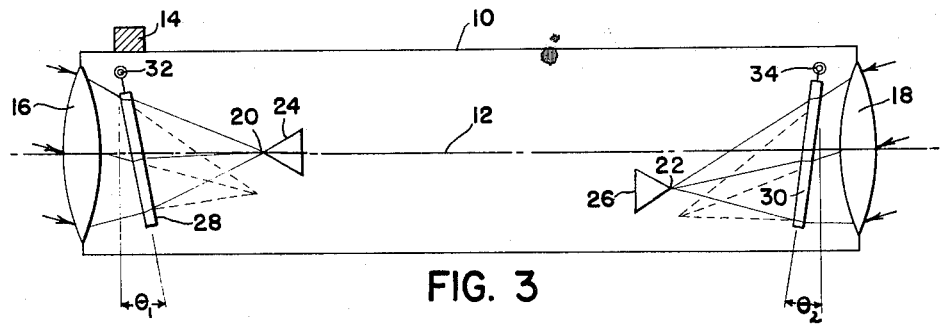
FIGURE 3 is a diagrammatic view corresponding to FIGURE 1 but including additional means which will permit the measuring of the extent of the deviation of the image from a fiducial reference element which element also appears in FIGURES 1 and 2.

Turning now to FIGURE 3, it can be explained that this figure has added thereto a pair of plane-parallel plates 28, 30, the function of these plates being to center the images 20, 22 with their associated fiducial elements 24, 26. The plates 28, 30 can be considered pivotally mounted with respect to the points denoted 32, 34. With such a basic arrangement, it will be appreciated that when the plates 28, 30 are individually moved so as to reorient the image 20 or 22, such an angle $\theta_1$ and $\theta_2$ will be representative of the degree of deviation of the images from the fiducial elements 24, 26. More will be said presently concerning the role played by these plates 28, 30 when describing the embodiment set forth in FIGURE 4.

Figure 4:
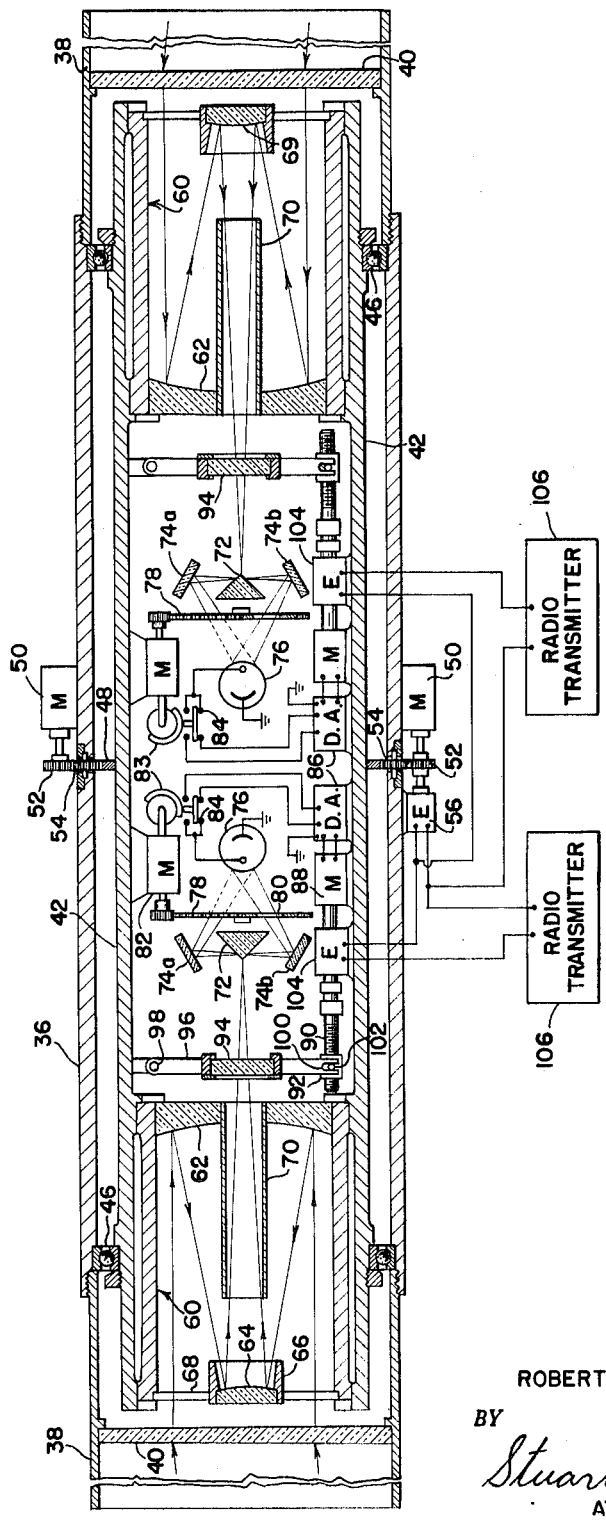
FIGURE 4 is a horizontal sectional view of one embodiment that my invention may assume.

Focusing attention now on the embodiment pictured in FIGURE 4, it will be observed that this embodiment includes a tubular frame 36 that is carried on the space vehicle or satellite. Stated somewhat differently, the frame 36 serves as a support for the components hereinafter referred to. For instance, the frame 36 supports a pair of tubular shields 38 projecting axially therefrom at each end. It may be explained at this time that the purpose of these shields 38, as will be better understood later on, is to minimize the amount of radiation from the sun that would otherwise fall on the optical elements described hereinafter. Also, the radiation may come from the earth or other sources. Still further, the shields 38 will extend sufficiently outward so as to be useful in reducing the number of micrometeorites that would otherwise impinge directly on the optical elements.

Each tubular shield 38 acts as a support for a collinearizing wedge 40 or equivalently a collinearizing reflecting element. Before describing these wedges 40 in further detail, it will be helpful to point out in a general way that the telescopic system of the instant invention makes use of stars in the celestial sphere that deviate from diametricity by an amount preferably no greater than one degree. Such stars can be readily found and various tables are available listing such stars. Having mentioned the desirableness of diametricity, it should perhaps be further pointed out that stars brighter than those of the eighth magnitude should preferably be selected. Thus, there are really two simple requirements that should be met in order to realize the full benefits of the invention. However, all of the star pairs which meet these requirements might not be acceptable for a particular application. For instance, the number of star pairs might be tailored down by a factor of about ninety percent after applying the following additional refinements. In this regard, the stars should be stars with a small parallax and a small proper motion. It is not advisable for the stars to be too close to the elliptic because of the possibility of getting into the path of the sun. Further, it is sometimes necessary to select star pairs which occupy various positions in the celestial sphere so the stars should be, let us say, ninety degrees apart in some cases. It is also undesirable to have stars which are in a field of intense starlight. A nearby star can therefore disqualify a particular star pair.

Because of the need for collinearizing wedges, we are more interested at the moment with the stars being nearly opposite each other. Having mentioned the desirability of having the stars meet certain minimal brightness requirements, it should be explained that the brightness is of importance in order to allow collection of more photons, that is, a greater total of radiation would be realized and thus a higher level of accuracy in the pointing system would be achieved. Stated otherwise, by collecting more photons it will be possible to reduce the integration time for a given accuracy and thus make measurements in less time. Should it be decided to take a pair of stars, one of which is rather dim with respect to the other, it may be desirable to make the telescope at one end of the system more sensitive than at the other. This is generally disadvantageous. From the standpoint of any deviation from the diametricity, it is desirable that we have stars as nearly as possible opposite, and we have established a criterion in this respect of one degree. If the stars differ by significantly more than this, there will be a danger that systematic errors in measuring the relative positions of these two stars will be encountered. These systematic errors arise because of the necessity of collinearizing the starlight with a wedge possessing certain inherent limitations.

One such limitation stems from the chromatic aberration that would become more and more pronounced with a deviation from true diametricity up to the above-mentioned one degree. Where deviations up to one degree are expected, an achromatic design is mandatory in order to adapt the instrument for use with radiation over an extended range of wave lengths without introducing errors into the system. Chromatic aberration, it is to be noted, comes about because of the refractive index of glass being dependent upon the wavelength or color of the light utilized. As a result, the paths of light rays through an optical system will be directly influenced by the color of the light. Accordingly, one attempts to construct a system so that the position and size of the image therein is the same for two or three given wavelengths (or colors). These wavelengths can be selected so that the deviations for intermediate wavelengths are negligible. The correction of an optical system for chromatic aberration is most frequently obtained by combining a positive lens of low dispersion glass with a negative lens of high dispersion glass to form a cemented doublet. Frequently, crown and flint glasses are employed to correct for chromatic aberration.

Figure 7:
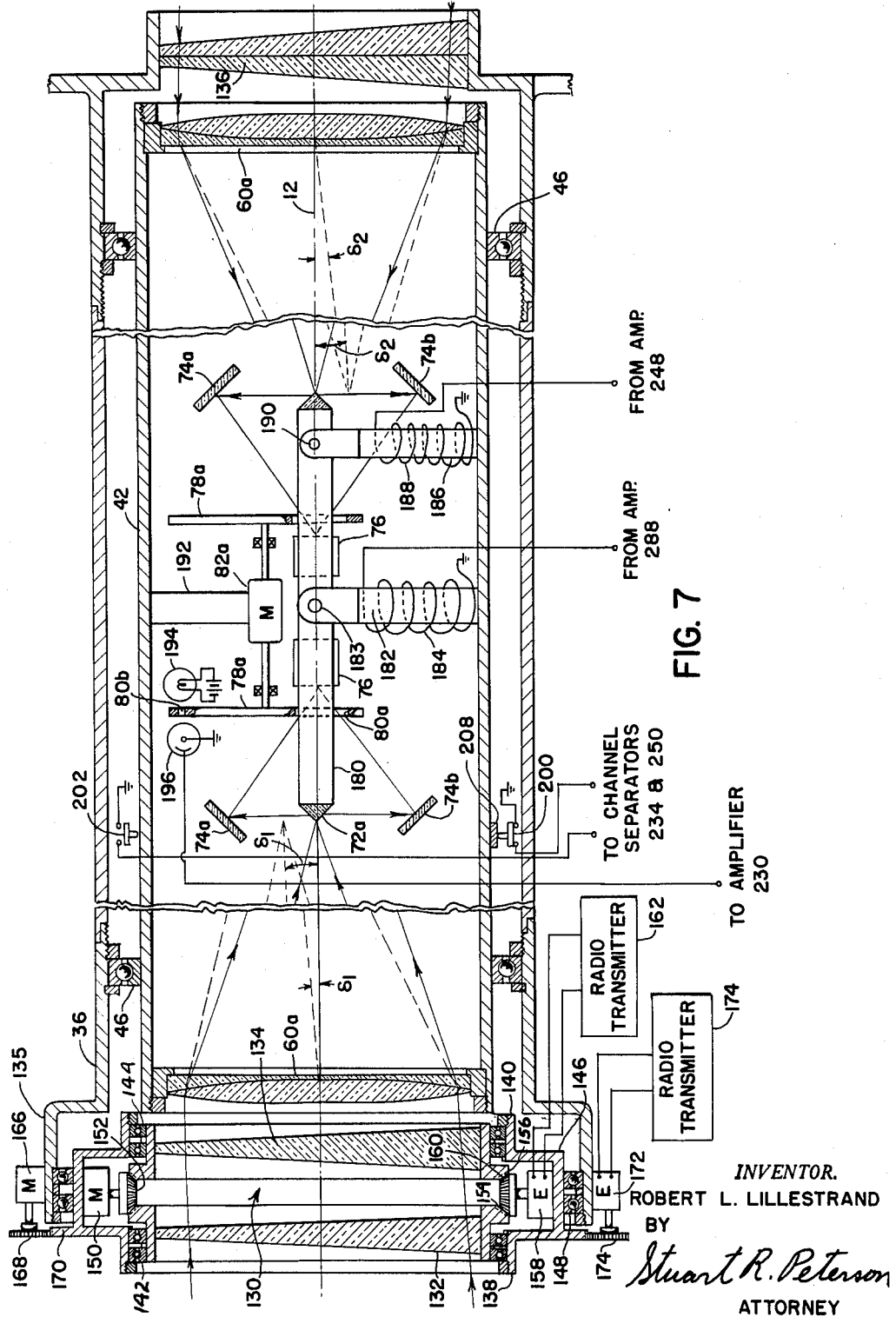
FIGURE 7 is a longitudinal sectional view of a further embodiment within the purview of the invention.

With the above-presented information in mind, it is felt that the reader will have a much better appreciation of the need for the collinearizing wedges 40 appearing in the embodiment of FIGURE 4, although a somewhat different arrangement is employed in the modification pictured in FIGURE 7. At any rate, it will be understood that the wedges 40 are selected for particular star pairs. Also, it is to be realized that all of the deviation from the desired diametricity can be compensated for with just one collinearizing wedge 40. In the illustrated situation, though, we have in effect taken out half of the deviation from diametricity with identical collinearizing wedges, each of which is placed at one end of the apparatus.

Concentrically disposed within the tubular frame 36 is a cylindrical or sleeve member 42 that is rotatable about its longitudinal axis 12. In the exemplified situation, a pair of radial loaded ball bearings 46 are shown. Since one of the most important design characteristics of a system of this type relates to the minimization of bending as the cylinder 42 rotates, the selection of a radial ball bearing design helps tremendously in achieving this particular aim. In other words, a minimum of a constraint or thrust is desired, even when there is expansion and contraction of the components comprising the system. It will be understood that the showing of the bearings 46 is only schematic and is not representative of the actual design that would be employed. In practice, supplemental means might well be selected in order to assist in reducing any bending moments that the cylinder 42 might experience in operation. As stated above, the mechanical rigidity of the structure supporting the two telescopes is one of the major design requirements for the system. Not only is it possible for the bearings to induce an unwanted mechanical strain, but it is also possible for the propulsion system of the vehicle in causing an acceleration to distort the telescope tube. Generally this will not be troublesome for satellites, coasting space vehicles and for space vehicles with accelerations as low as $10^{-2}$ g's. It is not explicitly described in the drawings, but it is assumed that normal means will be taken to minimize these accelerational strains such as in locating the bearings and in proportioning the structure. Another technique is to design the supporting structure such that if bending takes place it rotates the optical components about the nodal points, the nodal point being that point about which a rotation will not laterally translate the image.

Describing now the means by which the inner cylinder 42 is rotated relative to the tubular frame 36, it is to be discerned that a ring gear 48 has been fixedly disposed about the circumference of the cylinder 42. The bearings 46 provide a spacing between the inner and outer members 42 and 36, respectively. To reduce the torsional deflection and bending of the telescope tube as much as possible, it is planned that two driving motors 50 be utilized. To eliminate unwanted reaction torques resulting from speed changes in the drive motors 50 or from irregularities in the friction of the bearings 46, the two drive motors can be proportioned and geared so as to have an angular momentum which is equal and opposite to that of the rotating cylinder 42. These motors each carry a pinion 52 that is enmeshed with an idler gear 54 which in turn is enmeshed with the aforementioned ring gear 48. It will be assumed that the motors 50 operate continuously. For the purpose of measuring the angle of rotation of the cylinder 42 relative to the frame 36, an encoder 56 is employed. For the purpose of understanding the present invention, it can be pointed out that the encoder 56 merely closes a circuit at prescribed degrees of rotation of the cylinder 42 with respect to the frame 36. For instance, one might desire to collect information every one or two degrees. Consequently, the encoder 56 can be considered to be capable of closing a circuit 80 to 360 times in the course of one revolution. The particular number of measurements to be taken depending upon the required accuracy and the nature of the application to which the apparatus is being put. To visualize the encoder in a simplified form, one might view the ring gear 48 as having a number of angularly spaced projections distributed around one side thereof so as to actuate a switch each time that a projection comes into engagement therewith. In other words, the particular construction of the encoder 56 is not particularly important, as its function is to merely measure the degrees of rotation of the cylinder 42 so that information hereinafter provided can be sampled.

While telescopes of various types might be employed in carrying out the objectives of the invention, such as refracting, reflecting or a combination of refracting and reflecting elements, for the sake of illustration a pair of Cassegrainian telescopes have been depicted, these telescopes having been designated in their entirety by the reference numeral 60. Each telescope 60 includes a primary mirror 62 and a secondary mirror 64. The mirror 64 is set in a light baffle 66 which in turn is supported by a spider or yoke labeled 68. A relatively long light baffle 70 is carried by the primary mirror 62 and extends therethrough for the passage of light in forming a stellar image at the focal point.

It is at the focal point associated with each telescope 60 that a roof edge prism 72 is fixedly disposed with respect to the cylinder 42. These prisms 72 are reflective in character and serve the purpose of splitting the stellar image in each instance so that it will be divided and then directed onto a pair of radially spaced mirrors 74a, 74b. These mirrors 74a, 74b are angularly oriented so as to direct the split image onto a photosensor or detector 76, such as a photomultiplier tube. In some instances pyramids should be used for the prisms 72.

In traversing a path from the mirror 74a, 74b to the photosensor 76, the light must pass through a chopper 78 having an opening 80 which is of arcuate configuration extending over approximately 180° of the chopper's surface. The chopper 78 is rotated through the agency of a chopper motor 82 having a cam disc 83 mounted thereon.

The cam disc 83 in each instance actuates a double-pole, double-throw switch 84. The switch 84 is in circuit with a differential amplifier 86, the output of which is connected to a motor 88. As will presently be understood, the amplifier 86 is responsible for causing rotation of the motor 88 in either direction in dependency upon the direction in which the switch 84 is closed during a given interval. The motor 88 is coupled to a precision screw 90 which has threaded thereon a nut 92.

The means used to shift the stellar image is by rotation or swinging movement of a plane-parallel plate in the optical path, the plate associated with each of the telescopes 60 having been given the reference numeral 94. The plane-parallel plays the role of an optical lever, and thus a change in the apparent angular position of the star might require that the plane-parallel plate be tilted through an angle which is 500 times the change in apparent star position. It will be observed that the plate is carried on an arm 96 which is pivotally connected to the cylinder 42 at a pivot point 98. The other end of the arm which is opposite from the pivot point is of a clevis construction and is slotted at 100 so as to straddle a pair of pins 102 projecting in opposite directions on the nut 92.

Since the purpose of the plane-parallel plate 94 is to impinge the stellar image relative to the knife edge provided by the prism 72, it follows that one desires to know just what angular position the plane-parallel plate is in at a given moment. Any change in the angularity or swing of either plate 94 is indicative of the apparent aberration angle which was considered in the earlier presented description of FIGURES 1–3. For this reason, an encoder 104 is incorporated into the system which is capable of representing or indicating the angular position of the plate 94 at any particular moment. Here again, the encoder 104, as with the previously referred to encoder 56, can assume a variety of constructions. All that is demanded of the encoder is that it provide a precise signal having a characteristic which is variable in accordance with the degree of angularity or swing of the plate 94 with which it is associated. The signal from each encoder 104 is delivered to a radio transmitter 106 which in the illustrative situation telemeters the derived intelligence back to earth. It will be understood that suitable slip rings (not shown) would be employed in providing a conductive path from the encoder 104 to the transmitter 106. Owing to the presence of the encoder 56 which is in circuit with the encoder 104 for each half of the system, it will be appreciated that signals are transmitted only in accordance with the incremental angular changes in rotation of the cylinder 42 with respect to the tubular frame 36. Consequently, the magnitude of transmitted information can readily be plotted at various angular intervals in order to produce a graphical representation of the apparent angular misalignment of the two stars with respect to the angle through which the cylinder 42 has rotated. More will be said concerning this during the operational sequence soon to be given. However, it should be appreciated at the present moment that the information so derived need not be transmitted back to earth, for in some space operations such information might be delivered to a computer or other mechanism located on the satellite or space vehicle.

Before presenting a typical operational sequence, attention is drawn to the fact that a transient thermal environment can present a problem. In this respect, the satellite structure, if a satellite is the carrying medium, may have a thermal gradient or gradients across it because of uneven radiation supplied by the earth as it rotates about the earth. Although not shown, the gradients of this character can be mininized by surrounding the tubular frame 36 with insulating material. This is particularly true for those gradients which would tend to cause a transient bending of the cylinder. Of course, with the present system, such thermal gradients are actually minimized because of the rotation of the cylinder 42 within the frame 36. Thus, the major effect of this will not be to cause an angular misalignment, but will be such as to cause only a slight change in the focusing characteristic of the entire system.

With the above understanding of the elements and their organization with respect to each other in the system, the operation of the system itself and the manner in which it may be utilized in the previously referred to environments or applications will be readily understood from the added description which follows. Having selected a pair of stars of appropriate magnitude and also stars having the proper amount of diametricity, the dual telescopic system of FIG. 4 when space-borne will have the motors 50 continuously energized so that the cylinder 42 is constantly rotated with respect to the frame 36. A minimum system for the measurement of stellar aberration in the plane perpendicular to the optical axes would be one in which the relative angles of the cylinder 42 with respect to the tubular frame 36 would be for a zero degree position, a 90° one, the 180° position and the 270° one. By so doing, a comparison can be made between the 0° and 180° measurements and thereby the alignment error would be cancelled of course. With the information provided, one could then deduce the velocity aberration in that particular direction. However, with the added information from the 90° and 270° positions, a comparison can be made with the 0° and 180° deviations. These additional deviations, that is the 90° and 270° deviations, would give a measure of the two components of aberration in the plane perpendicular to the optical axes of the telescopes 60. Consequently, in theory it is possible to stop the cylinder 42 at discrete angular positions and then restart it, but this causes an unacceptable reaction torque in the satellite or space vehicle structure which must be compensated for. It is for this reason that the cylinder 42 is rotated slowly but continuously so that samples can be taken at various definite angles as the rotation progresses. Statistically, the direction and magnitude of the aberration can be accurately determined after one complete revolution. In fact, statistically it is possible to gain adequate information for the cancellation of alignment error by measuring the positions of the plane-parallels 94 over a range of angles less than 360°, say as small as 45 to 90°. The remainder of the curve can then be obtained by extrapolation. It will of course be noted that the particular angular positions at which information is transmitted is not of any importance whatsoever, this being due to the fact that we are only interested in relative angular positions of the cylinder 42 and of course the telescopes 60 which are rotated in unison therewith.

What transpires during a normal operation is that, as the cylinder 42 rotates, the stellar image produced by either or both of the telescopes 60 may tend to be displaced from the apex or roof edge of either prism 72. However, any deviation from a true centrally disposed position will cause more light to be reflected to one side than to the other side. For example, if the light from the mirror 74b is more intense than that from the mirror 74a, this will create an unbalance in the differential amplifier 86. The differential amplifier then produces an error signal which drives the motor 88 in the proper direction so as to swing the plane-parallel plate 94 in a manner so as to return the image to the knife edge of the prism 72. In returning the image to such a null positon on either prism 72, the encoder 104 will produce a signal representative of the change in angular position of the particular plane-parallel plate 94 that has been reoriented. It is this information that is employed in determining the aberration angle. As herein pointed out, any alignment error between the prisms 72, which act as fiducial markers, will be balanced out so that they do not adversely affect the aberration angle that is determined through the agency of the instant telescopic system.

Figure 5:
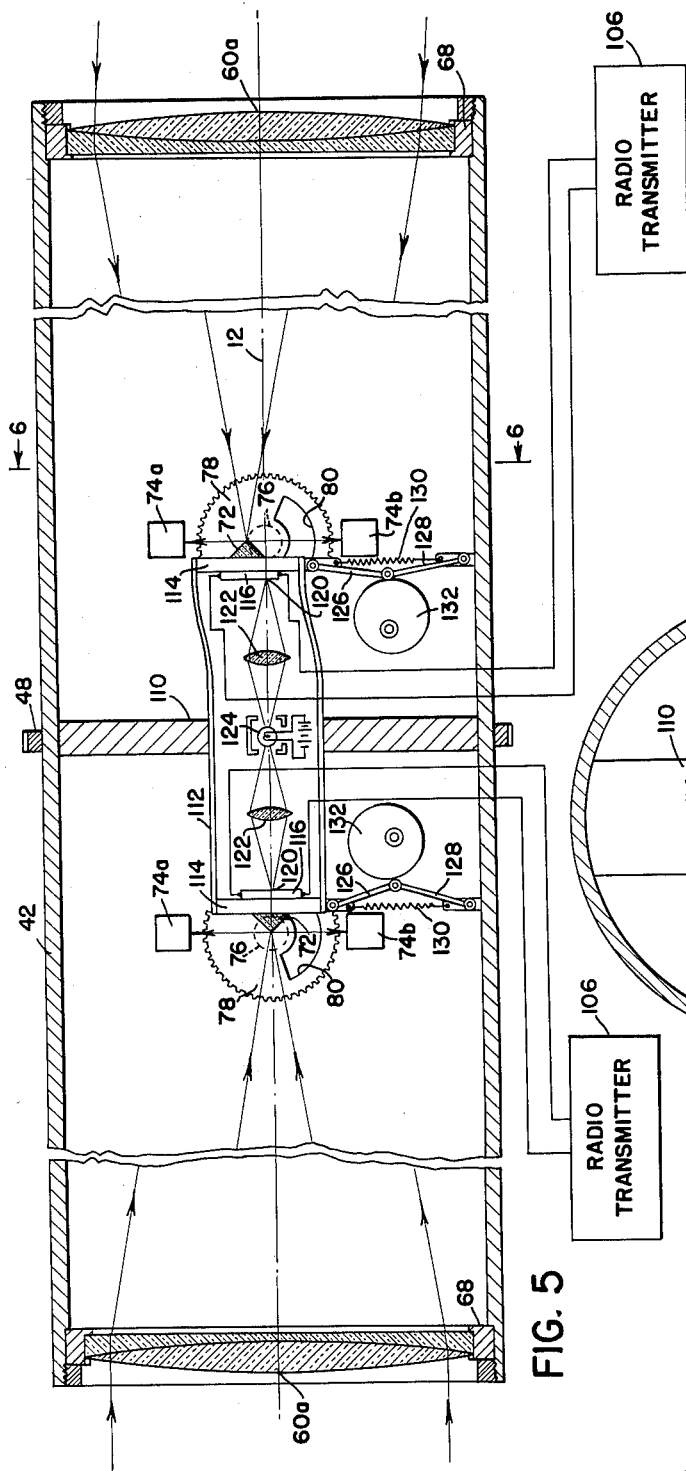
FIGURE 5 is generally similar to FIGURE 4 but illustrates a different sensing arrangement from that utilized in FIGURE 4.
Figure 6:
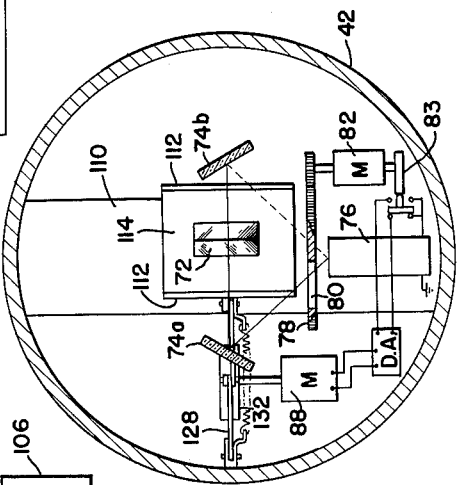
FIGURE 6 is a sectional view taken in the direction of line 6—6 of FIGURE 5.

Inasmuch as the embodiment set forth in FIGURE 5 is generally similar to that of FIGURE 4, considerable simplification can be achieved by showing only the salient components necessary to orient the reader. Accordingly, it will be observed that the cylinder 42 appears again in FIGURE 5, this being rotatable about its longitudinal axis by means of the ring gear 48. Instead of showing the Cassegrainian telescopes 60, further simplification has been realized by showing only a single lens unit at each end of the cylinder 42. Owing to the analogous functioning of the lens units now appearing, they have been distinguished from the telescope 60 by the subscript "a." As with the telescopes 60, the achromatic lenses 60a are responsible for directing light from a star in each instance onto the roof edge prisms 72 associated with these elements 60a.

Continuing with the description of the embodiment presented in FIGURE 5, a partition member 110 has been depicted as being fixedly disposed within the cylinder 42. This partition serves as a support for the neighboring ends of two pairs of normally parallel springs 112. It will be observed that these springs 112 extend in opposite directions and at their free ends in each instance support a small platform 114.

On each platform 114 is a semiconductor member 116 having a junction intermediate its ends. Semiconductors of this type are well known and have been utilized heretofore for their transversal photo effect. It is also possible to use the lateral photo effect and attention is drawn to an article entitled "A New Semiconductor Photocell Using Lateral Photo Effect," by J. Torkel Wallmark, this article having appeared in the April 1957 proceedings of the I.R.E. In the present instance a spot of light 120 is provided for each of the semiconductors 116, such a light spot 120 being formed through the agency of a pair of convergent lenses 122 associated with a common source of light 124. Thus, any shifting or translation of the light spots 120 relative to the junctions of the semiconductor members 116 will be indicated by the development of a small photo voltage. The magnitude of this photo voltage will be indicative of the degree of light spot translation.

From what has been said above, it is believed readily apparent that the semiconductor arrangement appearing in FIGURE 5 is utilized in lieu of the plane-parallel plates of FIGURE 4 together with their respective encoders 104. In the present embodiment all that need be done is to amplify the respective photo voltages and these voltages will be representative of the amount that the prisms 72 have to be moved by the motors 88 in order to produce a null condition of the system. In other words, the prism mirrors 72 operate in the same fashion as they do in FIGURE 4 and the photosensor 76 (although positioned differently) is employed for the production of a signal which is passed to the differential amplifier 86 associated with each motor 88. The motors 88 in turn position the platforms 114 rather than the plane-parallel plates as in the previous embodiment. Instead of the precision screw and nut arrangement 90, 92 employed in FIGURE 4, it will be noted that this modification is better suited to the use of a pair of links 126, 128 articulatively connected together, to the platform 114, and to the cylinder 42. A coil spring 130 causes the connected ends of the links 126, 128 to ride against an eccentric 132 driven by the motor 88 in each instance. As with the embodiment of FIGURE 4, the motors 88 will cause the reflective prisms 72 to be moved to a null position with respect to the stellar image formed by the lenses 60a. The right-hand prism 72 of FIGURE 5 has been displaced from its normal position, the springs 112 having yielded to allow such a displacement to occur quite readily.

It is believed that sufficient information has been given for a complete understanding of the modification pictured in FIGURE 5. Considerably more detail could be presented, but it is not seen that any additional description would serve any worthwhile purpose. Emphasis should be placed on the fact, though, that the relatively massive plane-parallel plates 94 are not needed in the embodiment just described. The chromaticity problem of the collinearizing wedges 40 has already been dealt with at some length. All that need be said at the moment is that such a problem also exists to a degree with respect to the use of plane-parallel plates such as the plates 94 and the present embodiment obviates the need for achromatizing the plates 94, for they are dispensed with in the current situation. Likewise, Herschel wedges, hereinafter referred to, are not relied on in the embodiment just described. Therefore, it is believed manifest that the sensing system does have certain advantages over the earlier-described embodiment, especially since it does not employ refracting elements in making the desired determinations. This permits one to use the instrument in regions of the spectrum, it may be explained, which would not otherwise be possible. It also allows one to use wider spectral regions, thereby utilizing a greater proportion of the incoming radiation.

Next to be described is the embodiment set forth in FIGURES 7 and 8. It will be observed that an effort has been made to separate the control features from the more or less mechanical and optical details. Consequently, attention is first directed to FIGURE 7. While in the embodiment depicted in FIGURE 4 use was there made of a pair of collinearizing wedges 40, in the modified embodiment now being referred to it will be pointed out at the outset that at the left end there is a Herschel wedge labeled collectively by the numeral 130, this wedge including a pair of relatively rotatable refracting elements 132, 134. However, it will be observed that a collinearizing wedge 136 is employed at the right, this wedge being achromatized, that is, being made of two materials having different indices of refraction and dispersions. In this regard, it will be recalled that an achromatized design has already been mentioned. This particular view simply shows this arrangement rather schematically.

It is rather important to appreciate that the instant embodiment emphasizes the versatility and the flexibility of the invention. Inasmuch as certain elements reappear in the present embodiment that have heretofore been referred to, the same reference numerals have been utilized in conjunction with these substantially identical elements. For instance, it will be observed that the frame 36 is again used, but in this situation the frame is equipped with an integral extension 135, the extension 135 being cylindrical in configuration but of a larger diameter than the frame 36. The extension 135 serves as a support for various elements now to be described.

First of these elements is a retainer 138 for the Herschel element 132. A similar retainer is provided for holding the other Herschel element 134. Bearings 142, 144 permit the elements 132, 134 to be rotated relative to each other. A ring or annular member 146 having a channel-shaped configuration when viewed in cross section circumscribes both of these bearings 142, 144. The ring member 146 is journaled for rotation with respect to the extension 135 by means of still another bearing labeled 148.

For the purpose of rotating the Herschel elements 132, 134 in opposite rotative directions, a motor 150 is employed, this motor having a bevel gear 152 drivingly connected thereto. The bevel gear 152 is enmeshed with beveled gear teeth 154 distributed about the retainer 138 and this bevel gear 152 is also enmeshed with similar teeth 156 formed on the retainer 140. Consequently, whenever the motor 150 is energized, the Herschel wedge collectively indicated by the numeral 130 has its component elements 132, 134 rotated in opposite directions. Although the need therefor will be better understood hereinafter, it should be pointed out that it is desired that an indication be derived of the relative positions of the Herschel elements 132, 134. Accordingly, an angle encoder 158 is mounted on the member 146, this encoder having a bevel gear 160 associated therewith which is engaged with the teeth 154, 156 so as to be driven in a manner representative of the positions of the elements 132, 134. As explained in conjunction with the encoder 104 of the previously described embodiment set forth in FIGURE 4, the information provided by the encoder 158 might well be used on the satellite or space vehicle itself, then being fed to an appropriate computing device. However, for the purpose of illustration, it will be assumed that the information is to be telemetered to a ground-based installation and for this purpose a radio transmitter 162 has been shown. This corresponds with the radio transmitter 106 of the embodiment depicted in FIGURE 4.

It is a desideratum of the invention as far as the present embodiment is concerned to rotate the Herschel elements 132, 134 in unison. This is the office of the motor 166. This motor has connected thereto a gear 168 which is engaged with a series of teeth 170 disposed about the ring member 146. The motor 166 is mounted on the extension 135 and when energized will rotate the member 146 together with the retainers 138, 140 and their elements 132, 134, this occurring through the intermediary of the bevel gears 152, 160 if these bevel gears are not then rotating. Of course, a combination of concurrent rotations is possible if the bevel gear 152 is being rotated by its motor 150. Here again, it is desired that the relative angle of the member 146 be indicated and an angle encoder 172 serves this purpose. It is mechanically coupled to the ring member 146 via a gear 174. The particular reading of the encoder 172 is fed to a transmitter 174 in order that the intelligence or information can be telemetered to the previously referred to ground-based installation. Of course, as with the information from the encoder 158, the information from the encoder 172 might also be utilized on the satellite or space vehicle.

It is recognized that the particular manner in which the motors 150 and 166 are energized has not as yet been presented. However, the manner in which these motors are controlled will be readily understood when a description of FIGURE 8 is given.

Reference has previously been made to the employment of reflective knife edge prisms, the earlier-described prisms having been denoted by the reference numeral 72. Identical prisms are employed in the embodiment now being described, but inasmuch as they are carried at the opposite ends of an elongated member 180, the instant prisms have been distinguished by the suffix "a." The member or support 180 is fulcrumed on a thermally expansible element 182 by means of a pivot pin 183. The thermal element 182 expands or contracts according to the extent of heating caused by current passing through a coil 184. The reason for employing the thermal element 182 is because the misalignment of the telescopic system is a slowly varying function of time. If used in a satellite the misalignment might vary periodically as the vehicle revolves about the earth. Therefore, it is desirable that the control of this system as far as its misalignment correction is concerned is that it possess a very slow response characteristic. Although the manner of energizing the coil 184 has not as yet been explained, it can be said at this time that the material for the element 182 has a low heat conductivity. Such a material is preferably Invar, a well-known nickel steel containing about 36% nickel, that expands practically not at all at ordinary temperatures. Invar would of course be used where the range of misalignment that is expected would be rather small; if the misalignment should be expected to be appreciable, then a more readily expansible metal would be substituted.

Although its purpose may not be fully appreciated with the amount of description that has been given so far, it might be explained that by sensing the average error over a number of revolutions of the cylinder 42, it is possible to determine the collinearity deviation as far as various angular positions of the cylinder 42 are concerned. In this way, and it will be made more readily understood in explaining the details of FIGURE 8, a signal can be generated which will cause expansion or contraction of the thermal element 182, thereby automatically aligning the system. It has already been pointed out that the response rate of the element 182 is desirably quite slow. Actually, this rate will be the slowest of any of the rates hereinafter referred to. Actually, it will have a rate in the neighborhood of 0.0002 cycle per second which is the approximate period of rotation of an earth satellite.

Introducing now the servo having the highest response rate, being approximately 200 cycles per second, attention is directed to the right-hand of the supporting member 180. At this end is employed a magnetostrictive element 186 having an energizing coil 188 circumscribed thereabout. Pivotal connection with the member 180 is achieved through the agency of a pivot pin 190. The term "magnetostriction" refers to the change in dimensions of a ferro-magnetic material when it is placed in a magnetic field. Magnetostriction is exhibited by the ferro-magnetic materials: iron, nickel, cobalt and most alloys of these three metals. The change in length under a magnetic field is very small. Of course, we are going to be herewith dealing with very small increments. Because sufficient information has not as yet been given with respect to the utilization of the magnetostrictive element 186, it is difficult to appreciate fully the benefits to be derived from its incorporation into the system. However, it can be mentioned at this time that the utilization of the element 186 in the system permits measurements of relative star positions independently of the direction in which the telescopic system is pointing.

In FIGURE 4, a pair of chopper motors 82 were referred to. In FIGURE 7 only a single motor is employed and it has been given the reference character 82a. For purposes of illustration, it has been shown as being supported on a member 192. The choppers themselves have been assigned the reference numeral 78a. These discs 78a can have one or more openings 80a. The salient difference over the previously referred to chopper 78 resides in the added aperture or opening 80b in each disc. While mechanical commutation or phase sensing was utilized in the embodiment of FIGURE 4, the present embodiment makes use of a photoelectric phasing. With the phasing objective in mind, a suitable source of light 194 is positioned so as to impinge upon a photocell 196 whenever the aperture or opening 80b comes into view. Thus, the signal delivered by the photocell 196 is in lieu of the cams 83 and their associated switches 84. The manner in which the signal from the photocell 196 is employed is better reserved for explanation when describing FIGURE 8 in detail.

For proper processing of signals, it is necessary to correlate the rotative positions of the cylinder 42 with the processing operation. Accordingly, it is planned that a plurality of switches 200, 202, 204 and 206 be quadrantly disposed with respect to the cylinder 42. For convenience, these switches may be considered to be mounted on the interior of the frame 36. Actuation of the switches at 90 degree intervals of rotation of the cylinder 42 is effected through the agency of a cam 208 carried by said cylinder 42. In FIGURE 7 only the switches 200, 202 appear, these switches being representative of what will be termed the "X" channel. From the sectional view presented in FIGURE 8, such view being on an appreciably reduced scale from what it appears in FIGURE 7, it will be discerned that the switches 204, 206 would be representative of the "Y" channel.

Sufficient information has now been given, it is believed, to afford a ready understanding of the control circuitry depicted primarily in block form in FIGURE 8. To assist in orienting the reader, the photocells 76 and 196 have been reproduced in block form in FIGURE 8. The photocells 76, it will be recalled, pick up the light reflected from the prisms 72a located at each end of the fulcrum member 180.

It will be assumed for the sake of explanation that the satellite or space vehicle on which the frame 36 is carried has had its attitude suddenly changed. This is responsible for the tilted position of the member 180. Owing to the fact that the knife edges or prisms 72a have been shifted with respect to the longitudinal axis 12 of the cylinder 42, the degree of angular shift of the frame 36 can be denoted by $\delta_1$ and $\delta_2$. The photocells 76, more specifically photomultiplier tubes, are responsible for producing signals $e_1$ and $e_2$ which will soon be referred to in more detail. It must be borne in mind that the attitude change has been quite sudden and that the images have been moved so rapidly to their respective phantom outline positions that there is an unbalance in the light striking the knife edges of the prisms 72a. In other words, a stellar image unbalance exists as a result of the attitude change. From what has been said in conjunction with the earlier-described embodiments, it can be appreciated that unbalance signals are produced. It is these signals that have been denoted by the characters $e_1$ and $e_2$. The manner in which these signals are obtained in the instant embodiment will soon be better understood, as has already been stated just above.

Proceeding now with a detailed explanation of FIGURE 8, it can be seen from this figure that the photosensors 76 are connected to a pair of preamplifiers 210. Because of a slight difference in the construction of the preamplifiers 210, the one on the left has been assigned the numeral 210a and the one on the right the numeral 210b. Due to the chopping action provided by the choppers 78a, the light striking the two sides of each of the knife edge prisms 72a produces an electrical signal from each sensor 76 that contains an alternating component whose amplitude is a measure of the extent to which the light images formed by the telescopic units 60a are not perfectly centered on the respective knife edges or prisms 72a. Each of the preamplifiers 210a, 210b is of a four stage variety where the input stage is merely a pentode with a cathode follower output. The reason for having given a different subscript to the two preamplifiers 210 stems from the fact that the preamplifier 210a is provided with an attenuator which effectively reduces the gain of this particular preamplifier.

The outputs from the two preamplifiers 210a, 210b are then fed into an automatic gain control circuit labeled 212. The output from the gain control 212 is connected back to the preamplifier 210a. It will be recalled that this preamplifier 210a has an attenuator in its input, this being in the form of a resistor between the preamplifier 210a and its associated photocell 76. While the circuitry constituting the automatic gain control 212 and the preamplifiers 210a, 210b is fairly straightforward, nonetheless an explanation in all likelihood should be presented relating to the need for the automatic gain control action.

Accordingly, in explaining the need for the control 212, it will be recognized that not only is it desirable that the measurements of the relative angles between the stars be independent of the instantaneous direction of pointing of the telescopes 60a, but that it is also desirable that this measurement be made independent of the rates of change of the direction of pointing of the telescopes. Of particular importance are those rapid, although small, changes which take place as the telescopes 60a are rotated because of the imperfection of the bearings 46. In addition, if the structure to which the telescopic system is mounted, this structure having been generally designated by the frame 36, contains other instrumentation which must be the source of uncompensated reaction torques, then these torques might be expected to cause changes in the direction of pointing of the telescopes 60a.

Continuing in this light, we have assumed that the satellite or space vehicle has been suddenly tilted because of an uncompensated reaction torque. Owing to this happening, the telescopes 60a have also been tilted and the signals $e_1$ and $e_2$ have been generated. Through the intermediary of the magnetostrictive device or element 186, these knife edge prisms will be moved to a position such that the signals $e_1$ and $e_2$ will equal zero. If the shape and intensity of the inner images at each knife edge prism 72a is the same, the value of $e_1$ minus $e_2$ during this transient response will always be zero, and as will later become more understandable there will be no command to change the position of the Herschel wedge elements 132, 134. Thus, under these conditions, the measurement of the relative angles between the stars is independent of the rate of change of direction of pointing of the telescope 60a.

If however, the images do not match perfectly in shape or in intensity, then an erroneous measure of the relative angles between the stars can occur during the time of a sudden change in the direction of pointing of the telescope 60a. Equalization of intensity in order to avoid this problem is made in the automatic gain control circuitry 212.

First of all, it may be explained in connection with the control 212 that the intensity of the stars may differ, perhaps by as much as ten times. In order to correct for this disparity, the automatic gain control 212 introduces an attenuation into the preamp 210 thereby reducing the signal derived from the brighter of the two stars and thus making the sum of the voltages derived from the two reflectors 74a, 74b at the left equal to the sum derived from the two reflectors 74a, 74b at the right. This procedure is operationally equivalent to attenuating the radiation entering the photocell 76 associated with the brighter of the two stars to such an extent that the light intensity falling on both photocells is the same. This "normalization" procedure will also compensate for differences in the sensitivity of the photocells 76 or more specifically the photomultipliers constituting these photosensing devices.

Having corrected for the disparity intensities, it may also be necessary to correct for differences in the shape of the star image at the knife edge prisms 72a. For example, one telescope 60a might happen to be somewhat out of focus and the image might be as much as 20% or 30% wider than for the other telescope 60a. In order to correct for this disparity, it will be necessary to match the error slope for the two systems. This can also be done with a somewhat modified automatic gain control 212. As a result of the foregoing steps, it is within the realm of possibility to largely desensitize the overall system to rates of change in the orientation of the telescope frame 36 by a factor of at least ten. That is, an instantaneous change in direction of the telescope tube or cylinder 42 of 0.5 second or arc will result in an intantaneous error in measurement of relative star positions of only 0.05 second of arc. As the transient dies out, this error will progressively decrease. Thus, whether the intensity of the starlight coming in one telescope differs from that coming in the other, whether the sensitivity of one photocell 76 differs from that of the other, or whether the net overall gain of one preamplifier 210 varies considerably from the other, the effect of the automatic gain control circuitry 212 is to make the signals from the left and right-hand sides of the photosensors 76 equal before they are processed further.

Next in the processing scheme is a pair of mixing transformers labeled generally by the reference numerals 214a and 214b. The function of the mixing transformer 214a is to provide a difference signal, that is $e_1$ minus $e_2$, and accordingly its primary coils 216, 218 are wound in an opposing manner. The secondary coil of the transformer 214a has been indicated by the reference numeral 220. On the other hand, the mixing transformer 214b is to perform a summing operation as far as the signals $e_1$ and $e_2$ are concerned, so the primary coils indicated by the numerals 222 and 224 are wound in an aiding manner. The secondary coil for the transformer 214b has been denoted by the reference numeral 226. Consequently, we now have obtained two signals representative of $e_1$ plus $e_2$ and $e_1$ minus $e_2$. Assuming that a chopping frequency of 2000 cycles per second has been employed in conjunction with the chopping action provided by the motor 82a and its discs 78a, these sum and difference signals are of an A.-C. frequency of 2000 cycle per second also. The signals from each of the mixing transformers 214a and 214b, that is, from their respective secondaries 220 and 226, is in each instance fed to a conventional phase sensitive demodulator. These demodulators have been given the reference numeral 228 and are preferably of the ring demodulator type. Such demodulators are fully described in the Control Engineers' Handbook edited by John G. Truxall and published by McGraw-Hill Book Company, Inc., 1958 edition, page 6-63. The reference signals for the demodulators 228 are provided by the photocell 196 which is energized through the intermediary of one of the chopping discs 78a. In the illustrated situation, the reference signal is fed to an amplifier 230 which in turn is coupled to the two demodulators 228 by way of a capacitor 231. As already explained, we have adopted a 2000 cycle per second signal. The reference signal applied to the demodulators 228 will be either in phase or 180° out of phase with the signals forwarded from the photosensors 76, depending upon the orientation of the reference windings within the demodulators. For filtering or smoothing out the basic 2000 cycle per second noise, filter 232 is connected in the D.-C. output of each demodulator 228. The cut-off frequency of the output filters 230 may be in the neighborhood of 10 cycles per second, thereby permitting the 0.5 cycle per second component introduced by the rotation of the cylinder 42 to be unaltered by this filtering action. In this regard, it will be assumed that the cylinder 42 has completed one revolution every two seconds.

Concentrating now on the output from the right-hand filter 232, it will be appreciated that the $e_1$ plus $e_2$ signal is a 0.5 cycle per second varying D.-C. signal which can be used to determine or control the attitude of the satellite or space vehicle on which the entire system is mounted. Therefore, the varying D.-C. signal provided by the right-hand demodulator 228 and its associated filter 232 is fed to what will be termed an "X" and "Y" channel separator 234. The channel separator circuit 234 may be considered to be composed of a pair of Schreiner circuits which are clearly shown on pages 6-64 of the previously alluded to Control Engineers' Handbook. The function of the channel separator 234 is to convert polar coordinate information delivered to it from the right-hand filter 232 to a system of rectangular coordinates which is necessary for the control of the satellite or space vehicle about its two axes which have been arbitrarily assumed to be "X" and "Y." The "Z" axis is parallel to the axis of rotation 12 of the telescopes 60a and therefore no signal can be obtained from specific form in which this system is presented. However, with respect to the "Z" axis it can be mentioned in passing that a pentagonal prism can be placed in one of the telescopes. If the ray deviation caused by the pentagonal prism is approximately 90°, it is possible to obtain "Z" axis control also. Additional detail would only unduly complicate the description so it is not illustrated.

Inasmuch as two Schreiner circuits comprise the channel separator 234, there are two reference windings. These reference windings can be considered to be for "X" and "Y" determinations. Inasmuch as there will be a total of four vacuum tubes in the dual Schreiner circuit constituting the separator 234, it can be readily explained that the switch 200 is instrumental in turning on one of the vacuum tubes in the "X" channel and the switch 202 is capable of turning on the other vacuum tube of this particular channel. By the same token, the switch 204 is responsible for turning one one of the vacuum tubes in the "Y" channel and the switch 206 is instrumental in turning on the other vacuum tube of the "Y" channel. In other words, the polar information is generated by means of the cam 208 and the switches 200–206 which are actuated at 90 degree intervals by this particular cam. Each channel of the separator 234 is provided with an output capacitor 235 and during the gating periods determined by the turning on and off of the various vacuum tubes, the amplitude of the $e_1$ plus $e_2$ signals are stored, the storage medium being the capacitors.

It will be noted that the outputs of the "X" and "Y" channels each feed into an integrator and power amplifier circuit 236, 238. The circuit 236 is responsible for energizing a motor 240 and the circuit 238 is similarly responsible for energizing a motor 242. These motors 240, 242 are D.-C. motors and are of the permanent magnet type. In other words, the field excitation is provided by a permanent magnet, thereby making the armature excitation supplied via the circuits 236, 238 responsible for determining the rotative speed of these motors. The motor 240 drives a flywheel 244 and the motor 242 drives a second flywheel 246. From FIGURE 8 it will be immediately discerned that the flywheel 244 rotates about an axis that is disposed at right angles with respect to the axis of the flywheel 246.

Consequently, if the flywheel 244 is oriented so as to correct the attitude of the satellite or space vehicle with respect to the "X" axis and the flywheel 246 is similarly intended to correct the attitude relative to the "Y" axis, a control arrangement is thus provided which is instrumental in determining and governing the attitude of the satellite or space vehicle. Thus, the channel separator 234, the circuits 236 and 238, the motors 240, 242 and their respective flywheels 244, 246 may be considered to comprise an attitude control servo.

In controlling the attitude, we have been employing the sum of the signals $e_1$ and $e_2$. In addiiton to being used for the attitude control, the signal $e_1$ plus $e_2$ is also utilized in properly energizing the magnetostrictive element 186 via its coil 188. It will be recalled that this element is used to position the knife edge prisms 72a.

To accomplish this aim, the output from the filter 232 at the right is also connected to an amplifier designated by the numeral 248. In describing the amplifier 248, it is only necessary to state that it is of a differential type. Hence, the quiescent current is adjusted so that a constant current normally flows through the coil 188 to which the output of this amplifier is connected. Such an arrangement allows movement of the magnetostrictive element 186 in both directions. In this way a signal from the right-hand demodulator 228 and its associated filter 232 causes the current to the magnetostrictive element 186, 188 to either decrease or increase from its bias or normal value. It can be pointed out at this time that the response of the element 186 is in the vicinity of 100 cycles per second. Thus, the amplifier 248 and the element 186 may be considered to comprise a servo for the knife edge prism 72a.

The next part of the system under discussion will be that of the servo arrangement for controlling the Herschel wedge 130. The signal utilized in doing this is the $e1$ minus $e2$ signal which comes out of the left-hand demodulator 70 and which is filtered by the left-hand filter 232 associated therewith. The left-hand filter 232 is connected to an "X" and "Y" channel separator 250. Actually, this separator 250 is the same as the separator 234 but it does provide a different function so a different reference numeral has been assigned to it. Hereagain, the separator constitutes a gating circuit which receives its reference from the same source as does the separator 234, this source constituting the various switches 200–206.

The two rectangular coordinate outputs from the separator 250 have been given the character designation $A_x$ and $A_y$. These outputs feed into respective circuit arrangements labeled 252 and 254, respectively. Each of the blocks bearing the reference numeral 252 and 254 includes a cathode follower and chopper. The cathode follower in each instance merely prevents discharging of the capacitors in the "X" and "Y" channels of the separator 250. Accordingly, one vacuum tube is used for each channel. However, the outputs of the two cathode followers are converted to A.-C. by employing a mechanical chopper. Such an arrangement is quite conventional and should be readily understood.

Attention is now drawn to the employment of a coordinate resolver denoted generally by the reference numeral 256. There is nothing unique in the resolver 256 but if further information is desired with respect thereto, reference may be made to page 17–7 of the previously mentioned Control Engineers' Handbook. As is customary, a resolver of the contemplated type is equipped with a desired number of stator and rotor windings. For our purposes, a pair of stator windings 258 and 260 are employed. The stator winding 258 is connected to a stage one servo amplifier 262, it in turn being connected to a second stage servo amplifier 264. It may be explained that the output from the winding 258 is equal to $A_x \sin \phi + A_y \cos \phi$ where $\phi$ is the angle through which the elements 132, 134 of the Herschel wedge 130 must be rotated to align the wave fronts entering the telescopes 60a.

Each of the two elements 132, 134 is rotated in the same direction as a result of the $\phi$ signal in this case. The output from the stage 2 servo amplifier which is of course controlled by the amplifier 262 drives a servo motor labeled 266, this motor being part of the resolver collectively indicated by the reference numeral 256. The motor 266 has connected thereto a pair of rotor windings 268, 270. It is not believed necessary to go into considerable detail, but it may be pointed out at this time that the motor 266 is connected in such a manner so as to drive the signal $A_x \sin \phi + A_y \cos \phi$ to zero. Therefore, $\tan \phi$ can be written as $A_y/A_x$.

The output of the motor 266 also drives a potentiometer comprised of a wiper arm 274 which is mechanically coupled to the motor 266 and a resistance element 276. It will be observed that the resistance element of the potentiometer 272 is connected across a source of D.-C. potential. The wiper arm 274 of the potentiometer 272 is responsible for producing an output which is proportional to the angle $\phi$.

Connected to the wiper arm 274 is a power amplifier 280. Other than the omission of the integrating portion of the amplifier 280, this amplifier resembles the previously mentioned integrator-amplifier 236. In other words, the feedback capacitor (not shown) employed in the amplifier circuit 236 is omitted in the amplifier 280. The output from the amplifier 280 is fed to the armature of the motor 166 which drives the gear 168 and thereby rotates the wedge elements 132, 134 in unison through the same angle and in the same direction.

The second output winding 260 of the resolver 256 provides a signal which is proportional to the maximum value $e_1$ minues $e_2$. This signal is an A.-C. signal at the chopping frequency obtained in the cathode follower and chopper circuits 252, 254. It may be explained at this time that a reference signal source 282 is utilized for each of the cathode follower and chopper circuits 252, 254. The reference signal is of a desired frequency which has been somewhat arbitrarily selected as being 400 cycles per second. This same source 282 can also be employed in conjunction with a demodulator 284, the function of which is to provide a D.-C. output which is proportional to the previously mentioned maximum value of $e_1$ minus $e_2$. The D.-C. output from the demodulator 284 is delivered to a power amplifier 286 corresponding to the previously referred to amplifier 280. The amplifier 286 energizes the motor 150 which drives the wedge elements 132, 134 in opposite directions. The motor 150, as with the previously mentioned motors 166, 240 and 242, is of the permanent magnetic field variety. This action, that is, driving the wedge elements 132, 134 in opposite directions, is responsible for causing the $e_1$ and $e_2$ signal to decrease toward a zero value.

What occurs then is that the angle encoder 158 is moved or rotated in accordance with the relative rotative positions of the wedge elements 132, 134. The encoder 158 thus produces a signal that is representative of the magnitude of star aberration and this information can be telemetered to a centrally located installation via the transmitter 162. On the other hand, the angle encoder 172 is influenced by the action of the motor 166. Hence, the encoder 172 produces a signal which is representative of the direction of aberration. It can be telemetered to the same installation by means of the transmitter 174. However, it will be recognized, as hereinbefore explained, that the output signals from the encoders 158, 172 could be fed to a computer aboard the satellite or space vehicle.

The output from the demodulator 284 also feeds an $I^2R$ power amplifier 288. The output of the amplifier 288 is delivered to the heating coil 184 associated with the thermal element 182. Hence, the alignment positions of the knife edge prisms 72a is controlled via the element 182. As already indicated by reason of the type of material selected or suggested for the element 182, the response of this portion of the system is very slow compared to the response of the servo control for the Herschel wedge 130. Thus, the amplifier 288 together with the thermally responsive element 182 comprises an alignment servo. Coupled with the material utilized for the element 182, it will be recognized that the long response time can be further controlled by introducing only a very small heating effect into the element 182 via its coil 184. Of course, it is not possible to achieve a zero or minutely small value of the amplitude of the sine wave involving the $e_1$ minus $e_2$ signal. However, the control introduced via the thermal element 182 minimizes the alignment error to such an extent that one does not have to wait for the cylinder 42 to be rotated through 180 degrees. As a matter of fact, the employment of the thermal element 182 which acts as an alignment servo makes it possible for readings to be taken at any time during rotation of the cylinder 42. This is possible because we are continually maintaining the telescopic system in proper alignment, and it is therefore not necessary to rotate the telescope through any appreciable angle, such as of the order of the previously mentioned 180 degree angle, in order to cancel the alignment error as shown in FIGURE 4. Of course, the amplifier 288 is of the differential type, similar in construction to the amplifier 248, so that some heat is introduced into the element 182 via the heating coil 184 so as to make the element 182 expansible and contractible with respect to a normal length. Stated somewhat differently, it is naturally desirable that the fulcrum point provided by the pivot pin 83 be moved in both directions, and the differential character of the amplifier 288 permits this.

From what has been said in conjunction with FIGURES 7 and 8, it is believed that sufficient information has been given for a practical utilization of the present embodiment. Hence, no real need is believed to exist for a detailed operational sequence at this point, for adequate operational description has been given as the explanation of the construction that this embodiment might assume progressed. However, it might be well to state in review that a chopper frequency of 2,000 cycles per second has been selected in connection with the chopping action afforded by the disc 78a. Likewise, a telescope rotation frequency, that is the frequency of rotation of the cylinder 42, has been selected as being 0.5 cycle per second. In connection with the servo control of the knife edge prisms 72a, a bandwidth of 100 cycles per second results, and in connection with the control of the Herschel wedge 130 a band width of 0.05 cycle per second exists. Still further, the alignment servo action involves a bandwidth of 0.005 cycle per second, and the attitude servo band width can be considered to be 0.005 cycle per second also. Still further, regarding the types of signals utilized, it will be recalled that the control for the knife edge prisms 72a involved the signal $e_1$ plus $e_2$ and this control is effected with amplitude only. The control of the satellite attitude was also derived from the $e_1$ plus $e_2$ signal and it likewise involved only amplitude. On the other hand, the control of the Herschel wedge 130 involves both amplitude and phase control. The alignment control also was derived from the $e_1$ minus $e_2$ signal and was concerned with only amplitude.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a telescopic system for measuring the apparent motions of a pair of substantially diametrically opposed sources of radiation wherein the position of one source appears to change relative to the position of the other source, said apparent motions being caused by velocity aberration during movement of said telescopic system relative to said pair of sources,
    a support member;
    a pair of generally oppositely directed telescope means mounted on said support member with the optical axes thereof substantially coincident for focusing said radiation from said sources to form images, said pair of telescope means being mounted on said support member for rotation on said coincident axes; and
    means responsive to changes of the position of said images upon rotation of said telescope means on said coincident axes through a preferred angle of rotation for indicating the apparent motions of said pair of sources.

2. A telescope system in accordance with claim 1 in which said preferred angle of rotation is 180 degrees.

3. In a telescopic system,
    a support member;
    a pair of generally oppositely directed telescopes mounted on said support member with the optical axes thereof substantially coincident, said telescopes producing first and second respective images;
    means for rotating said telescopes in unison relative to said support member about said coincident optical axes into selected angular positions;
    first means responsive to said first image for indicating the location of said first image relative to said coincident axes at said selected angular positions of said pair of telescopes; and
    second means responsive to said second image for indicating the location of said second image with respect to said coincident axes at said selected angular positions of said pair of telescopes.

4. In a telescopic system,
    a frame;
    a cylinder supported on said frame for rotation about its longitudinal axis;
    a pair of generally oppositely directed telescopes fixedly mounted in said cylinder for rotation therewith, each of said telescopes having the optical axis thereof substantially coincident with said longitudinal axis for focusing light to a point according to the direction of incidence of said light to said telescope;
    means carried on said frame for rotating said cylinder to rotate said pair of telescopes in unison from a first angular position to a second angular position;
    a pair of photosensors for generating signals in response to light impinging thereon;
    first means for causing said light focused by one of said telescopes to impinge upon one of said photosensors according to the direction of incidence of said light to said one of said telescopes;
    second means for causing said light focused by the other of said telescopes to impinge upon the other of said photosensors according to the direction of incidence of said light to said other of said telescopes; and
    means responsive to said signals generated by said pair of photosensors in response to said impinging light for determining the extent of any change in the direction of incidence of light striking said photosensors as said cylinder is rotated from said first angular position to said second angular position.

5. In a telescopic system for measuring the apparent motions of a pair of substantially diametrically opposed sources of radiation wherein the position of one source appears to change relative to the position of the other source, said apparent motions being caused by velocity aberration during movement of said telescopic system relative to said pair of sources:
- a frame;
- a pair of generally oppositely directed telescope means mounted on said frame with the optical axes thereof substantially coincident for focusing said radiation from said sources to form images, said pair of telescope means being mounted on said frame for rotation on said coincident axes;
- refracting means in the optical path of at least one of said telescope means for shifting the position of the image formed by said one of said telescope means;
- means responsive to changes of the position of said image upon rotation of said telescope means on said coincident axes through a selected angle of rotation for operating said refracting means to shift said image; and
- means responsive to said operation of said refracting means for generating signals indicative of the extent of shift of said image.

6. A telescopic system in accordance with claim 5 in which said shifting means includes a plane-parallel plate.

7. A telescopic system in accordance with claim 5 in which said shifting means includes a Herschel wedge.

8. In a telescopic system,
- a frame;
- a cylinder supported on said frame for rotation about its longitudinal axis;
- a telescope fixedly mounted in each end of the cylinder for rotation with said cylinder on the optical axis of said telescope, said telescope in each end of said cylinder being effective to focus an image at a point having a position indicative of the apparent direction of incident radiation to said telescope;
- means for splitting each of said images into balanced and unbalanced images according to the position of said focus point;
- a refracting means movable relative to each telescope for shifting the image of its associated telescope with respect to its image splitting means, and
- means connected to each refracting means and responsive to said unbalanced images arriving from its respective image splitting means for moving its respective refracting means to shift the image produced by its associated telescope relative to said image splitting means to balance said split images.

9. In a telescopic system,
- a frame,
- a cylinder supported on said frame for rotation about its longitudinal axis,
- a telescope within each end of said cylinder for rotation in unison with the cylinder, said telescopes in said cylinder being mounted with the optical axes thereof common with said longitudinal axis and being directed in substantially opposite directions;
- a photosensor for each telescope;
- image splitting means between each telescope and each photosensor, each of said image splitting means being effective to direct light onto its associated photosensor at two different angles;
- respective means responsive to any unbalance in light energy arriving via said two different angles for producing a signal indicative of the degree of unbalance;
- a refracting means for each telescope; and
- respective motor means connected to each refracting means and responsive to said respective signal for moving its associated refracting means to balance the light energy arriving via said two different angles.

10. A telescopic system in accordance with claim 9 in which each refracting means includes a pivotally supported plane-parallel plate, said motor means in each instance including a precision screw and nut drive for swinging said plates toward and away from the telescopes with which they are associated.

11. A telescopic system in accordance with claim 9 in which one of the refracting means includes a Herschel wedge composed of a pair of angularly movable elements, one of said motor means causing relative rotation of said elements to produce said null balance.

12. In a telescopic system,
- a frame;
- a member supported on said frame for rotation about its longitudinal axis;
- a telescope fixedly mounted in each end of the member for rotation with said member on the optical axis of said telescope, said telescope in each end of said member being effective to focus an image at a point having a position indicative of the apparent direction of incident radiation to said telescope;
- means for splitting each of said images into balanced and unbalanced images;
- constraining means mounting said image splitting means for movement transversely to said longitudinal axis;
- a semiconductor movable with each of said image splitting means for generating a signal in response to light directed thereon;
- means for directing a stationary light spot onto each of said semiconductors to render said semiconductors effective to generate said signals; and
- means responsive to said unbalanced images for moving said image splitting means and said semiconductors on said mounting means to balance said split images and to render said semiconductors effective to generate said signals indicative of the amount of said movement.

13. A telescopic system in accordance with claim 12 in which said constraining means includes oppositely directed leaf springs supported at their adjacent ends, the free ends of said spring supporting the respective image splitting means.

14. A telescopic system in accordance with claim 13 in which said moving means includes a motor for each image splitting means, said motors each having a cam for engaging said constraining means to produce said balance of said split images.

15. In a telescopic system,
- a frame;
- a member supported on said frame for rotation about a selected axis;
- a pair of generally oppositely directed telescopic fixedly mounted on said member with the optical axes thereof substantially coincident for rotation around said selected axis, each of said telescopes normally being effective to project an image to a given point;
- means for rotating said member about said selected axis;
- an image splitting means for producing balanced split images in response to each of said images projected to said given points;
- an elongated element pivotally mounted on said rotatable member, one of said image splitting means being mounted at one end of said elongated element and the other of said image splitting means being supported at the other end of said elongated element;
- respective photosensing means responsive to said split images from said image splitting means for determining any unbalance of said split images; and
- respective means responsive to said respective photosensing means for pivoting said elongated element in a direction to render said image splitting means effective to produce said balanced split images.

16. A telescopic system in accordance with claim 15 in which said last-mentioned means includes a magnetostrictive element.

17. A telescopic system in accordance with claim 15 in which a voltage signal is produced by each photosensing means whenever said elongated element is pivoted, which voltage signals are representative of the degree of pivoting, and means for summing said voltage signals, said means for pivoting said elongated element being controlled according to the sum of said voltage signals.

18. A telescopic system in accordance with claim 15 in which a voltage signal is produced by each photosensing means whenever said elongated element is pivoted, which voltage signals are representative of the degree of pivoting, means for summing said voltage signals, and means for correcting the attitude of said frame in accordance with the sum of said voltage signals.

19. A telescopic system in accordance with claim 18 in which said correcting means includes a pair of mechanisms, one for correcting the attitude about one axis and the other for correcting the attitude about a second axis, and means controlled by the rotative position of said rotatble member for causing said correcting means to control said respective mechanisms in accordance with the relative degree of rotation of said member.

20. In a telescopic system,
a frame;
a member supported on said frame for rotation about its longitudinal axis;
a pair of generally oppositely directed telescopes having coincident optical axes and being fixedly mounted on said member for rotation therewith;
means for rotating said member about said longitudinal axis;
reference means for defining a point of reference relative to said optical axes;
a Herschel wedge disposed in the optical axis of one of said telescopes, said Herschel wedge including a pair of relatively rotatable refracting elements for adjusting the optical path of light received by said one telescope relative to said reference means;
first means responsive to a first image from said one telescope which image deviates from alignment with the respective reference means for producing a first signal representative of the extent of said deviation of said first image;
second means responsive to a second image from said other telescope which second image deviates from alignment with the respective reference means for producing a second signal representative of the extent of said deviation of said second image; and
motor means responsive to the difference between said first and second signals for rotating said elements of said Herschel wedge to move said first image in the direction of said point defined by said reference means.

21. A telescopic system in accordance with claim 20 in which said reference means includes an elongated pivotal element having a fulcrum point, and means responsive to said difference in signals for shifting the fulcrum point of said pivotal element in the direction of said images.

22. A telescopic system in accordance with claim 21 in which said last-mentioned means includes a thermally expansible element, a heating coil therefor and means responsive to the difference between said first and second signals for energizing said heating coil.

23. A telescopic system in accordance with claim 20 including means for summing said first and second signals, and means responsive to the sum of said first and second signals for pivoting said elongated element in a direction toward the images produced by said telescopes.

24. A telescopic system in accordance with claim 23 in which said last-mentioned means includes a magnetostrictive element and an energizing coil therefor, said coil being energized in accordance with said sum of signals.

25. A telescopic system in accordance with claim 23 including means responsive to said sum of signals for changing the attitude of said frame in accordance with said sum of signals.

26. In a telescopic system for measuring the apparent motions of a pair of substantially diametrically opposed sources of radiation wherein the position of one source appears to change relative to the position of the other source, said apparent motions being caused by velocity aberration and by an error in the instantaneous pointing of said telescopic system during movement of said telescopic system relative to said pair of sources,
a support member;
a pair of generally oppositely directed telescope means mounted on said support member with the optical axes thereof substantially coincident for focusing said radiation from said sources to form images, said pair of telescope means being mounted on said support member for rotation on said coincident axes; and
means responsive to changes of the position of said images upon rotation of said telescope means on said coincident axes for shifting the position of said images to compensate for said instantaneous pointing error to render the relative position of the images substantially invariant with respect to said instantaneous pointing error.

27. In a telescopic system,
a frame;
pivotal reference means having a pivot point normally in a given position;
a pair of telescopes, each of said telescopes having an optical axis and being effective to produce an image, each image normally being directed onto said reference means;
means supported by said frame for mounting said pair of telescopes for rotation in unison about said optical axes;
respective photosensing means for producing first and second electrical signals representative of the extent said images formed by said telescopes are displaced from said reference means;
first means responsive to the sum of said first and second signals for pivoting said reference means on said pivot point;
second means responsive to the difference between said first and second signals and the rotative position of said telescopes for shifting said images toward said reference means;
third means responsive to the sum of said first and second signals for modifying the attitude of said frame; and
fourth means responsive to the difference between said first and second signals for shifting said pivot point of said reference means.

28. A telescopic system in accordance with claim 27 in which said first means has the fastest response rate, the second means the next fastest, the third means the next to slowest, and the fourth means the slowest response rate.

29. In a telescopic system,
a frame,
a pair of generally oppositely directed telescopes mounted on said frame for rotation about a common axis coincident with the pitical axes of said telescopes,
reference means mounted in a given position relative to said common axis,
said telescopes normally directing a pair of images onto said reference means,
a pair of relatively rotatable refracting elements aligned with the optical axis of one of said telescopes, and
means for rotating said refracting elements so as to angularly shift the image produced by said one telescope in the direction of said reference means.

30. In a telescopic system,
a frame;
a member support on said frame for rotation about its longitudinal axis;
a pair of generally oppositely directed telescopes having the optical axes thereof substantially coincident, said telescopes being mounted on said member for rotation in unison on said optical axes, each of said telescopes focusing an image at a point located relative to said coincident optical axes;

means for splitting said focused images, said images being unbalanced according to the relative spacing of said points from said coincident optical axes;

a pair of wedge-shaped refracting elements aligned with the optical axis of one of said telescopes, said elements being mounted for rotation about said axis in a plane generally perpendicular to said axis so that the angular position of said elements is determinative of the direction of light energy entering said telescope;

means for rotating each of said refracting elements to achieve a parallel relationship of the light energy entering said telescopes;

respective means responsive to said unbalanced images from said image splitting means for operating said rotating means; and means for measuring the angle of rotation of said elements.

31. In a telescopic system, a frame;

a pair of generally oppositely directed telescopes mounted on said frame for rotation about a common axis;

reference means between said telescopes for providing a point of reference for images from said telescopes;

first means for developing a first signal in response to the degree of deviation of the image produced by one of said telescopes from said point of reference;

second means for developing a second signal in response to the degree of deviation of the image produced by the other of said telescopes from said point of reference;

a pair of wedge-shaped refracting elements associated with one of said telescopes, said refracting elements being mounted for rotation about said common axes in a plane generally perpendicular to said axis whereby the relative angular positions of said elements controls the direction of the light energy entering said one of said telescopes;

means responsive to the difference between said first and second signals for rotating each of said refracting elements to achieve a parallel relationship of the light energy entering said one of said telescopes to thereby shift the image of said one of said telescopes with respect to said point of reference; and means for providing an indication of the angle of rotation of said refracting elements.

32. In a telescopic system for accurately observing a pair of substantially diametrically opposed sources of radiation independently of errors in the alignment of said telescopic system;

a support member;

a pair of generally oppositely directed telescope means mounted on said support member with the optical axes thereof substantially coincident for viewing said pair of sources, said pair of telescope means being mounted on said support member for rotation on said coincident optical axes; and means for rotating said pair of telescope means in unison on said coincident optical axes to render said viewing of said sources independent of the alignment of said optical axes of said telescope means.

References Cited by the Examiner

UNITED STATES PATENTS

| | | | |
|---|---|---|---|
| 2,688,896 | 9/1954 | Tripp | 88—2.7 |
| 2,930,545 | 3/1960 | Houle et al. | 88—2.7 |
| 2,953,621 | 9/1960 | Schultz | 88—23 |
| 2,975,668 | 3/1961 | Eckel | 88—1 |
| 3,107,168 | 10/1963 | Hogan et al. | 88—14 |

FOREIGN PATENTS

| | | |
|---|---|---|
| 223,970 | 6/1958 | Australia. |
| 1,021,436 | 12/1952 | France. |

OTHER REFERENCES

R.S.I. Publication; vol. 8, Mar. 1937; "Photoelectric Guiding of Astronomical Telescopes"; by A. E. Whitford and G. W. E. Kron.

DAVID H. RUBIN, *Primary Examiner.*

ARTHUR M. HORTON, EMIL G. ANDERSON, JEWELL H. PEDERSEN, *Examiners.*

UNITED STATES PATENT OFFICE
CERTIFICATE OF CORRECTION

Patent No 3,251,261                                        May 17, 1966

Robert L. Lillestrand

It is hereby certified that error appears in the above numbered patent requiring correction and that the said Letters Patent should read as corrected below.

Column 17, lines 36 and 37, for "el minus e2" read -- $e_1$ minus $e_2$ --; column 22, line 46, for "telescopic" read -- telescopes --.

Signed and sealed this 26th day of September 1967.

(SEAL)
Attest:

ERNEST W. SWIDER                                  EDWARD J. BRENNER
Attesting Officer                                       Commissioner of Patents